(12) United States Patent
Schwarzli

(10) Patent No.: US 6,960,852 B2
(45) Date of Patent: Nov. 1, 2005

(54) ELECTRICAL GENERATOR FOR A COIN MECHANISM AND COIN MECHANISM WITH AN ELECTRICAL GENERATOR AND METAL DETECTION AND RELEASE SYSTEM

(75) Inventor: Josef W. Schwarzli, Stouffville (CA)

(73) Assignee: Beaver Machine Corporation, Newmarket (CA)

( * ) Notice: Subject to any disclaimer, the term of this patent is extended or adjusted under 35 U.S.C. 154(b) by 49 days.

(21) Appl. No.: 10/680,153

(22) Filed: Oct. 8, 2003

(65) Prior Publication Data

US 2004/0119351 A1 Jun. 24, 2004

(30) Foreign Application Priority Data

Dec. 18, 2002 (CA) ............................................. 2414640

(51) Int. Cl.$^7$ ............................................. H02K 41/00
(52) U.S. Cl. ..................... 310/75 R; 310/112
(58) Field of Search ....................... 310/75 R, 112–118; 194/315–324

(56) References Cited

U.S. PATENT DOCUMENTS 5,439,089 A * 8/1995 Parker ......................... 194/317

| | | | |
|---|---|---|---|
| 5,909,795 A | 6/1999 | Porco et al. | |
| 5,954,181 A | 9/1999 | Schwarzli | |
| 6,041,022 A | 3/2000 | Tu et al. | |

FOREIGN PATENT DOCUMENTS

| CA | 2372995 A1 | 8/2003 |
|---|---|---|
| EP | 0 749 196 A2 | 12/1996 |

\* cited by examiner

Primary Examiner—Thanh Lam
(74) Attorney, Agent, or Firm—Dimock Stratton LLP; Mark B. Eisen

(57) ABSTRACT

An electrical generator in a coin mechanism supplies enough current to operate an electronic device or an electromagnetic device such as a solenoid, by providing a stator mounted about a rotor and driven by a spring-loaded drive wheel. The drive wheel rotates with the coin mechanism up to a release position, loading the spring. At the release position the drive wheel is released and snaps back to the rest position, driving the rotor and causing the rotor to rotate rapidly within the stator, generating an electric pulse. The electrical signal can be used to pulse a counter, electronic tag or other tracking device, and to recharge a small battery which may be provided as a backup or auxiliary power source. In one embodiment the invention further provides a means for determining whether a deposited coin is composed of metal or form a non-conductive material such as plastic or cardboard.

26 Claims, 9 Drawing Sheets

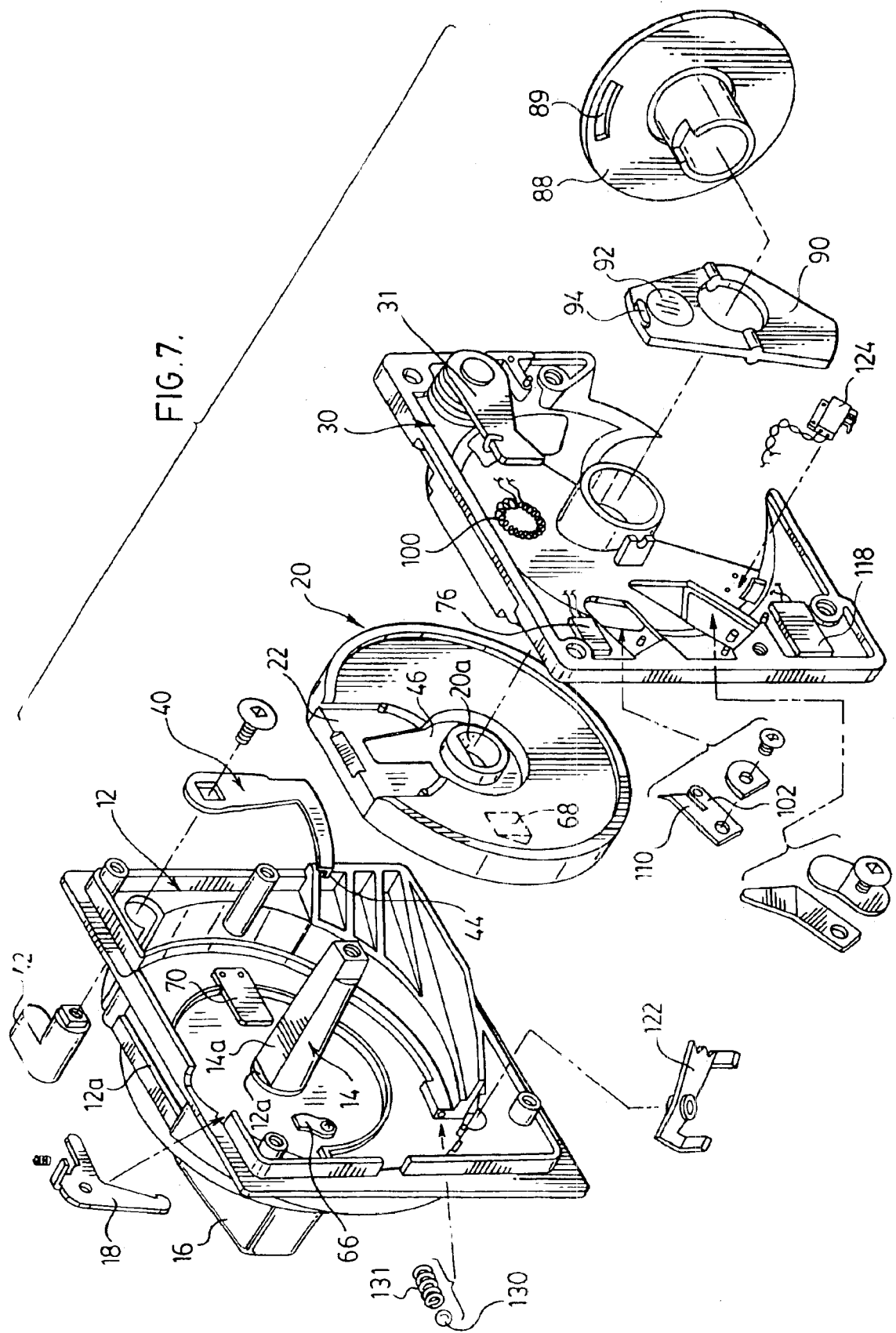

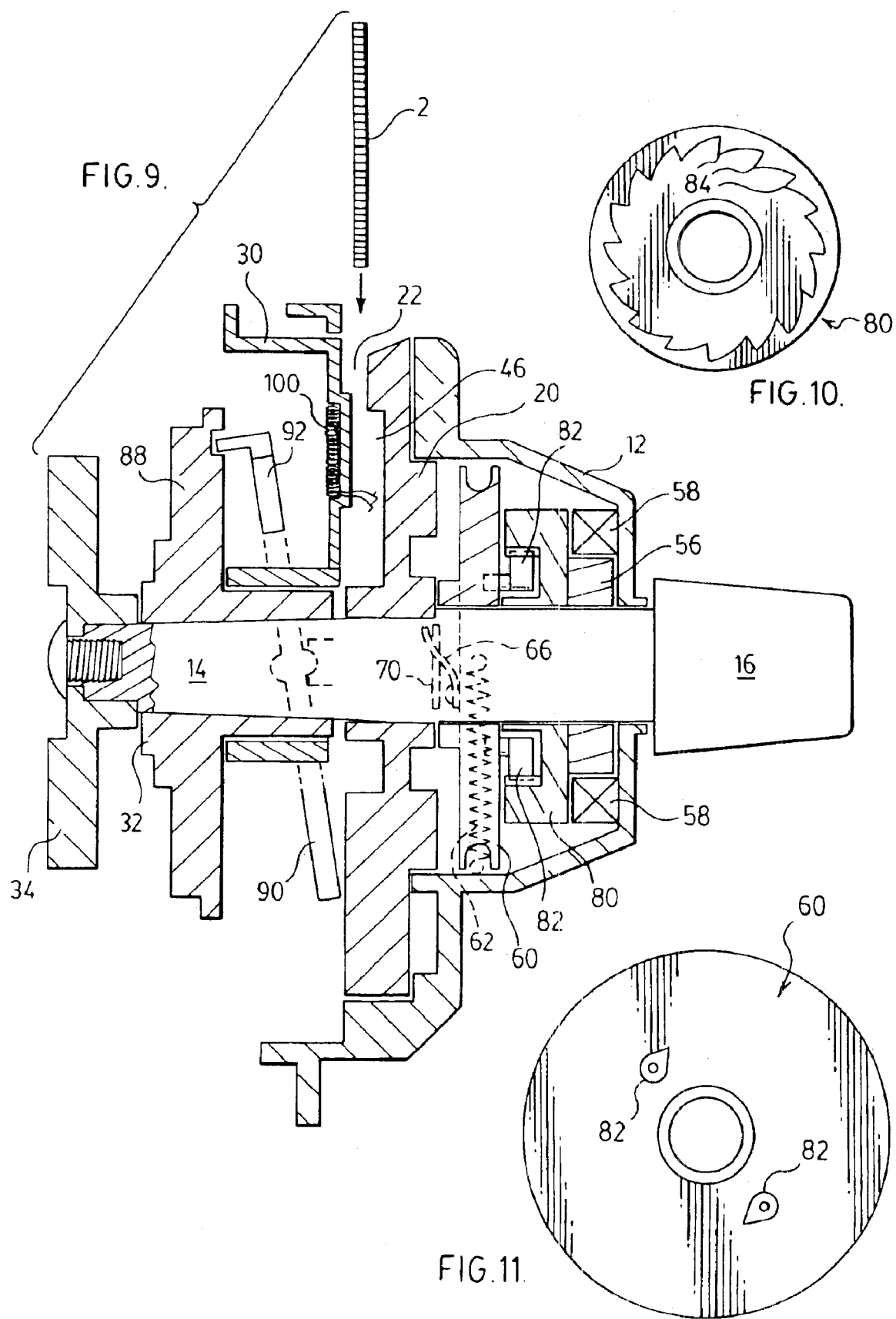

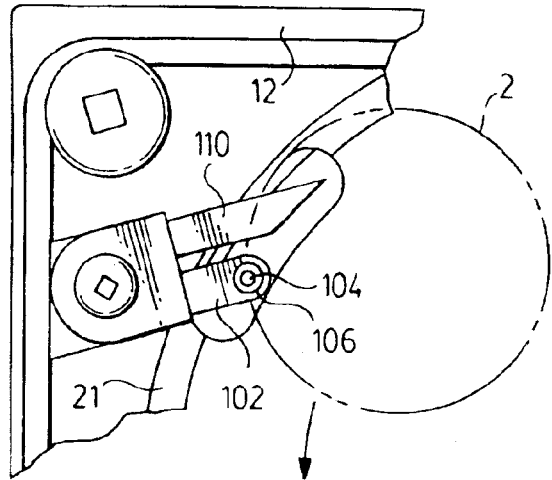
FIG.15.
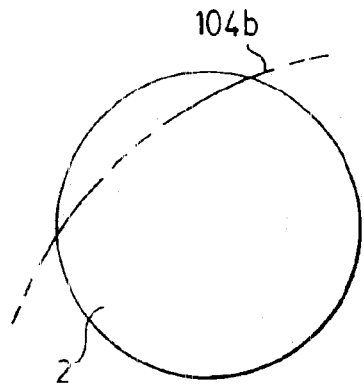
FIG.15A.
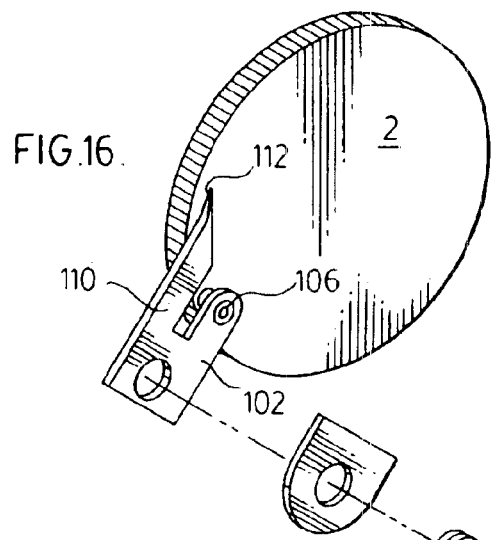
FIG.16.
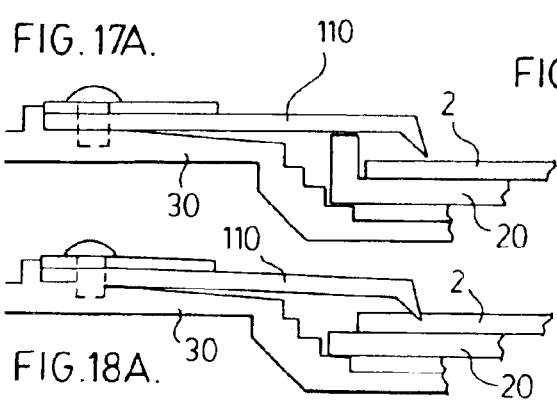
FIG.17A.
FIG.18A.
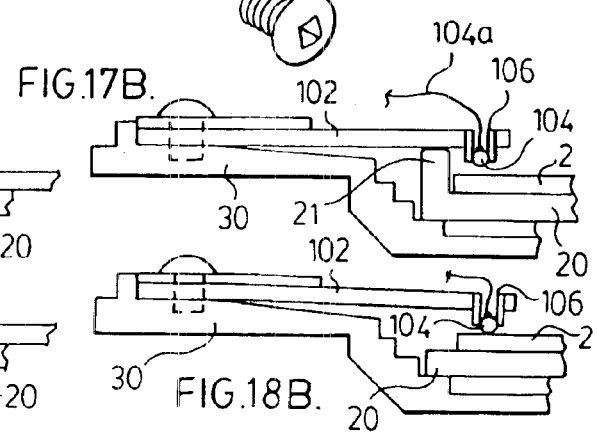
FIG.17B.
FIG.18B.

ELECTRICAL GENERATOR FOR A COIN MECHANISM AND COIN MECHANISM WITH AN ELECTRICAL GENERATOR AND METAL DETECTION AND RELEASE SYSTEM

FIELD OF INVENTION

This invention relates to coin mechanisms. In particular, this invention relates to an electrical generator for a coin mechanism, for operating an electrical or electronic device, and a coin mechanism having an electrical generator.

BACKGROUND OF THE INVENTION

Coin mechanisms are used to operate many different types of devices and machines, including vending machines, laundry machines, washroom stalls and so on. In such a coin mechanism, depositing one or more coins or tokens of the required denomination or type allows the user to actuate the coin mechanism, which in turn activates the device or machine.

Certain types of machines, for example so-called "bulk venders" (also colloquially known as "gumball machines") in which merchandise is dispensed from a bulk merchandise compartment by rotating a coin mechanism, it is desirable to be able to locate the machine in any high traffic locale. Operators of bulk venders need to have the flexibility to place the bulk vender in both supervised and unsupervised areas, regardless of the surrounding conditions. One of the ramifications of this is that bulk venders must be extremely theft- and vandal-resistant.

Furthermore, in order to maximize the versatility in placement of a bulk vender, it must not need electrical power to operate. This constitutes a significant limitation on what functions a bulk vender is able to perform.

For example, to avoid theft or "skimming" by service personnel it would be advantageous to provide an electronic counting device, which counts vends from the vender so that the operator can determine how many coins or tokens should have been collected since the previous service call. It can also be advantageous to track information regarding vends and the purchasing habits of users, for example using an electronic "tag" or another suitable device as described in Canadian Patent Application No. 2,372,995 to Schwarzli et al. filed Feb. 25, 2002, which is incorporated herein by reference.

In many cases it would be advantageous to be able to activate a solenoid, to either release the coin mechanism or to activate a gate or door that releases the merchandise, as this can render the coin mechanism more tamper-resistant and avoid the need for complex mechanical mechanisms that unlatch gates or doors to allow merchandise to be dispensed.

An electric current can also be used to help to distinguish coins having a metallic component from non-metallic slugs, which may be composed for example of plastic or cardboard. An example of a device for determining whether a coin is magnetic, and releasing the coin mechanism only when the coin is magnetic, is described and illustrated in U.S. Pat. No. 5,954,181 issued Sep. 21, 1999 to Schwarzli, which is incorporated herein by reference. However, the magnetic locking mechanism so described only reacts to a coin that has a magnetic component (iron or nickel). There are many denominations of coin around the world that are metallic but do not have a magnetic component, and there has heretofore been no reliable means available for discriminating between nonmagnetic metallic coins and plastic or cardboard slugs in a bulk vender. If an electric current were available, by interposing the deposited coin or token into an electrical circuit which can be closed only if the coin is composed of metal, it could be determined whether the coin is conductive (metallic) or non-conductive (non-metallic). This would provide an additional security feature and reduce operator losses due to the use of non-metallic slugs closely sized to the desired denomination of coin.

In all of these cases, however, the bulk vender would require electrical power in order to operate the electrical or electronic device or test the coin for conductivity.

Conventionally there have been only two ways to supply power to a bulk vender: provide a power cord and connect the machine to a mains power supply; or provide the vender with a battery. Requiring connection to a mains power supply significantly limits the variety of locations at which the bulk vender can be placed, as there must be a power receptacle nearby.

Providing the bulk vender with a battery is usually impractical, because batteries have a limited life. Although there are currently batteries available which are compact enough to fit into a coin mechanism and can last for a significant period of time, they deliver a very small current and are thus capable of operating a very limited variety of devices which require very low power, such as silicon chips. Moreover, when a battery runs out it does so suddenly and without warning, which can defeat the purpose of any counting or tracking device provided in the vender, and frustrate users who may be denied merchandise if the coin mechanism or merchandise release mechanism has stopped operating because of a low or dead battery.

It would accordingly be advantageous to provide an electrical power source in a bulk vender, and particularly in a coin mechanism, which does not require connection to a mains power supply, supplies enough current to operate an electromagnetic device such as a solenoid, and does not rely on a depleting energy source such as a battery.

SUMMARY OF THE INVENTION

The present invention overcomes these disadvantages by providing an electrical generator actuated by rotation of the coin mechanism. The electrical generator supplies enough current to operate an electronic device or an electromagnetic device such as a solenoid, and in the preferred embodiment to charge a battery at the same time which can be used as a backup and/or auxiliary power source.

The invention accomplishes this by providing a stator mounted about a rotor and driven by a spring-loaded drive wheel. The drive wheel rotates with the coin mechanism up to a release position, loading the spring. At the release position the drive wheel is released and snaps back to the rest position, driving the rotor and causing the rotor to rotate rapidly within the stator, generating an electric pulse.

In the preferred embodiment the drive wheel engages the rotor at the release position, and disengages from the rotor when the drive wheel has returned to the neutral position. Thus, the rotor acts like a flywheel and continues to rotate under its own momentum after the drive wheel has returned to the rest position, so the generator will continue to generate electrical power even after the drive wheel has stopped at the rest position. The generator is compact enough to fit within a conventional bulk vender coin mechanism, yet it generates an electrical signal having sufficient current to activate a solenoid. At the same time the electrical signal can be used to pulse a counter, electronic tag or other tracking device, and to recharge a small battery which may be provided as a backup or auxiliary power source.

The invention accordingly allows for the continuous use of an electronic counting or tracking device, and an electromagnetic device such as a solenoid which may be implemented to improve tamper-resistance or reduce the number and complexity of mechanical components in the coin mechanism, vender or other machine, without sacrificing either its reliability or flexibility in the use or placement of the machine. In one embodiment the invention further provides a means for determining whether a deposited coin is composed of metal or form a non-conductive material such as plastic or cardboard, and to thus help discriminate between a coin of the intended denomination and a slug.

The present invention thus provides a generator for a coin mechanism, comprising a stator, a rotor positioned to rotate within or about the stator, one of the rotor and the stator comprising at least one magnetic element and the other of the rotor and the stator comprising at least one coil, and a drive wheel being biased to a rest position by a biasing element and rotatable to a release position, the drive wheel being selectively rotationally coupled to the rotor such that when the drive wheel is rotated to the release position and released, the drive wheel drives the rotor as the drive wheel returns to the rest position, whereby as the rotor rotates the generator generates an electric current.

In further aspects of the generator of the invention: the drive wheel releases from the rotor as the drive wheel reaches the rest position; the drive wheel is rotationally coupled to the rotor by at least one pawl engaging at least one tooth; the pawl is biased to a position clear of the tooth and pivots to engage the tooth as the drive wheel starts to rotate to the rest position; the drive wheel engages the rotor at the release position; the wheel is biased to the rest position by at least one spring; the wheel is biased to the rest position by a pair of tension springs anchored to the wheel in substantially diametric relation; the tension springs wind into a groove formed in the periphery of the wheel; the generator is disposed in a coin mechanism and the wheel is rotated by a depressible member engaging a rotating portion of a coin mechanism; the wheel is released by a stationary projecting member which depresses the depressible member as the wheel reaches the release position, to disengage the depressible member from the rotating portion of the coin mechanism; the coil is on the stator; and/or the stator comprises a pair of coils.

The present invention further provides a coin mechanism, comprising a rotatable handle, a coin carrier rotatable with the handle when a particular type of coin or token is deposited into the coin carrier, coupled to a first driving member, and a generator comprising a stator and a rotor positioned to rotate within or about the stator, one of the rotor and the stator comprising at least one magnetic element and the other of the rotor and the stator comprising at least one coil, and a drive wheel being biased to a rest position by a biasing element and rotatable to a release position by a second driving member cooperating with the first driving member, the drive wheel being selectively rotationally coupled to the rotor such that when the drive wheel is rotated to the release position and released, the drive wheel drives the rotor as the drive wheel returns to the rest position, whereby as the rotor rotates the generator generates an electric current.

In a further aspect of the coin mechanism, the coin mechanism further provides a rotating member that rotates with the coin carrier, a rocker arm biased to a locking position latched to the rotating member to prevent rotation of the coin carrier, one of an electromagnet or a permanent magnet on the rocker arm, the other of the electromagnet or a permanent magnet disposed adjacent to the rocker arm in a position such that when the electromagnet is activated the rocker arm can be attracted to the permanent magnet, and a contact adjacent to the coin carrier, whereby when a metal coin or token is deposited into the coin carrier the contact touches the coin and closes a circuit which activates the electromagnet to attract the rocker arm to the permanent magnet and draw the rocker arm away from the rotating member to release the coin carrier and allow the coin mechanism to be rotated.

The present invention further provides a method of generating an electric current using a generator comprising a stator and a rotor positioned to rotate within or about the stator, one of the rotor and the stator comprising at least one magnetic element and the other of the rotor and the stator comprising at least one coil, comprising the steps of: a. biasing a drive wheel to a rest position, b. rotating the drive wheel to a release position, c. before, during or after steps a. and b., coupling the drive wheel to the rotor, and d. releasing the drive wheel, whereby after release the drive wheel drives the rotor as the drive wheel returns to the rest position.

The present invention further provides a metal detection and release system for a coin mechanism having a rotatable handle and a coin carrier rotatable with the handle when a particular type of coin or token is deposited into the coin carrier, comprising a rotating member that rotates with the coin carrier, a rocker arm biased to a locking position latched to the rotating member to prevent rotation of the coin carrier, one of an electromagnet or a permanent magnet on the rocker arm, the other of the electromagnet or a permanent magnet disposed adjacent to the rocker arm in a position such that when the electromagnet is activated the rocker arm can be attracted to the permanent magnet, and a contact adjacent to the coin carrier, whereby when a metal coin or token is deposited into the coin carrier the contact touches the coin and closes a circuit which activates the electromagnet to attract the rocker arm to the permanent magnet and draw the rocker arm away from the rotating member to release the coin carrier and allow the coin mechanism to be rotated.

DESCRIPTION OF THE DRAWINGS

In drawings which illustrate by way of example only a preferred embodiment of the invention, FIG. 7 is a partially exploded perspective view of the coin mechanism of FIG. 1, exploded from the coin carrier rearwardly, FIG. 9 is a cross-sectional side elevation of the coin mechanism of FIG. 1, FIG. 10 is a rear elevation of the clutch wheel, FIG. 11 is a front elevation of the drive wheel, FIG. 15 is a partial rear elevation showing the scraper and coin contact, FIG. 15A is an elevation of a coin showing the path of travel of the scraper and coin contact across the coin, FIG. 16 is an exploded perspective view of the scraper and coin contact, FIGS. 17A and 17B are top plan views of the scraper and coin contact, respectively, in the raised position, FIGS. 18A and 18B are top plan views of the scraper and coin contact, respectively, in the contacting position.

DETAILED DESCRIPTION OF THE INVENTION

Figure 1:
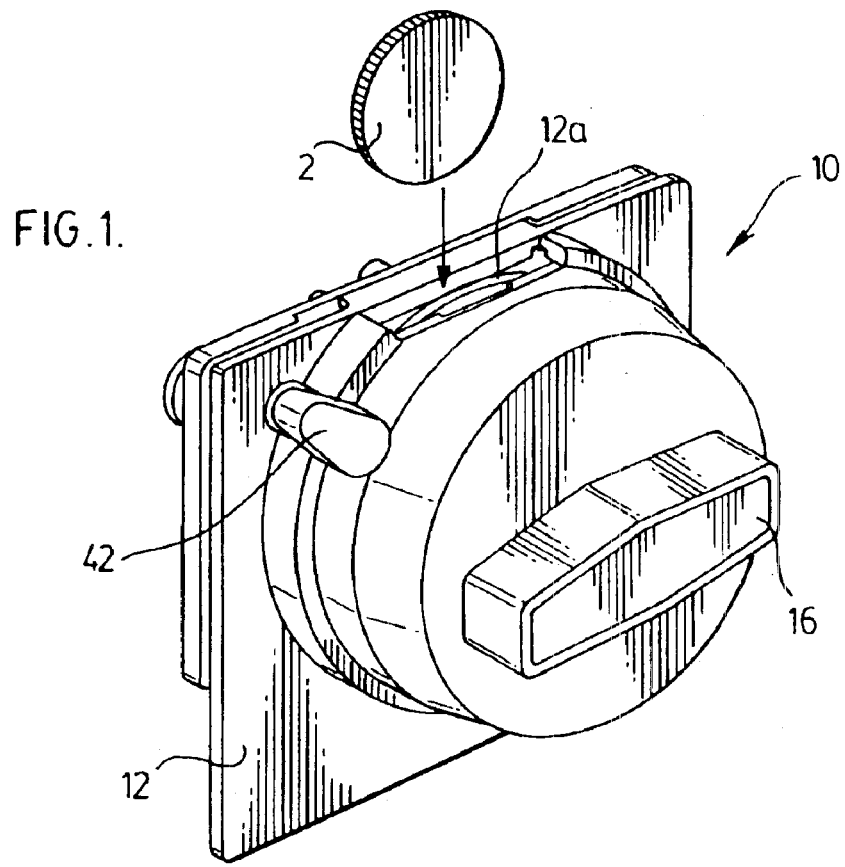
FIG. 1 is a front perspective view of a coin mechanism embodying the invention.
Figure 2:
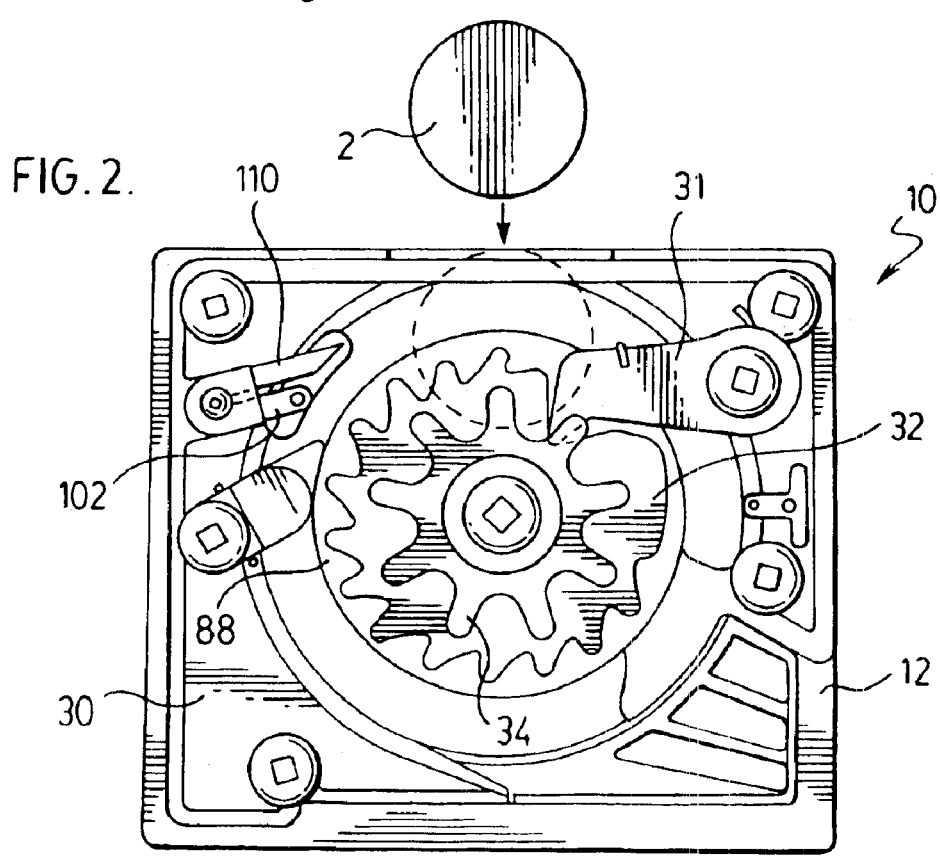
FIG. 2 is a rear elevation of the coin mechanism of FIG. 1.

FIG. 1 illustrates a coin mechanism 10 embodying the invention. The coin mechanism 10 conventionally comprises a cover plate 12 having a coin slot 12a and an opening (not shown) through which a shaft 14 of the handle 16 is rotatably disposed. As best seen in FIG. 7, the shaft 14 has a flat 14a for rotationally fixing the shaft 14 to a coin carrier 20 through opening 20a, such that the coin carrier 20 rotates as the handle 16 is turned. A diameter measuring dog 18 is pivotally mounted to the cover plate 12 near a starting position of the coin mechanism rotational cycle, to measure the diameter of a coin 2 inserted into the coin recess 22 through the coin slot 12a, and arrest rotation of the coin mechanism 10 if the coin 2 is not the correct diameter, as described and illustrated for example in U.S. Pat. No. 5,924,542 issued Jul. 20, 1999 to Schwarzli, which is incorporated herein by reference. A washer dog 19 may be provided to arrest rotation of the coin mechanism 10 if a washer is inserted instead of a coin 2, as is well known.

A back plate 30 is affixed to the cover plate 12 to retain the coin carrier 20. A ratchet gear 32 rotatably fixed to the shaft 14 is mounted over the back plate 30, cooperating with pawl 31 to prevent reverse rotation of the coin mechanism 10 once the handle 16 has been turned past the diameter measuring point (as described in U.S. Pat. No. 5,609,235 issued Mar. 11, 1997 to Schwarzli, which is incorporated herein by reference), and the dispensing gear 34 is rotatably fixed to the end of the shaft 14 to mesh with and rotate the dispensing wheel of the bulk vender (not shown) in conventional fashion, as is well known to those skilled in the art.

Figure 5:
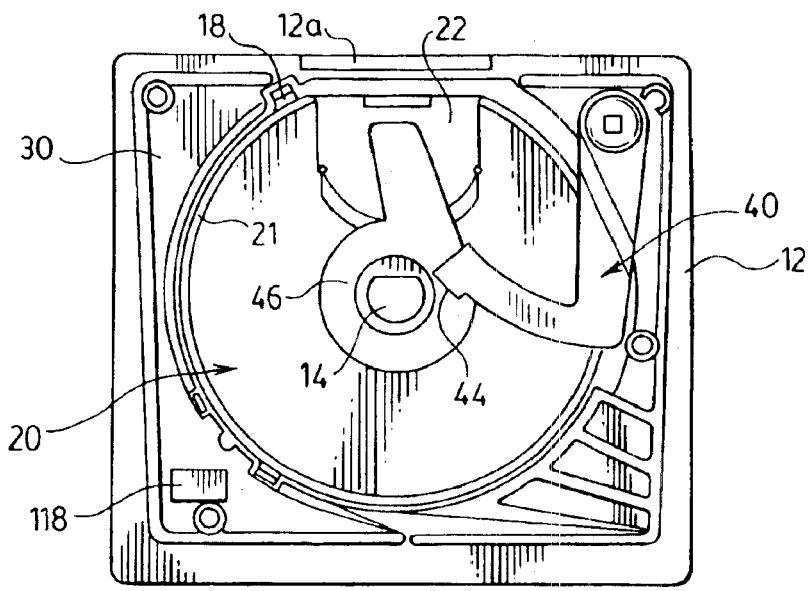
FIG. 5 is a rear elevation of FIG. 4 showing the coin ejection finger.
Figure 6A:
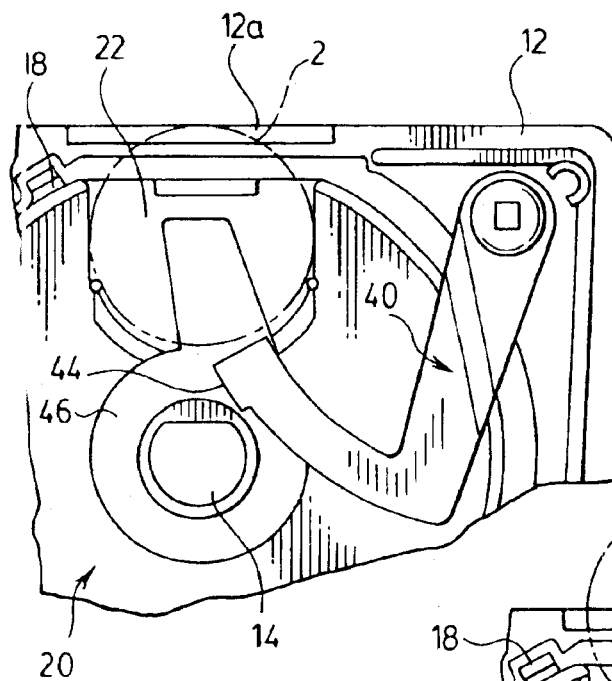
FIG. 6A is a partial rear elevation of FIG. 4 showing the coin ejection finger in a rest position.
Figure 6B:
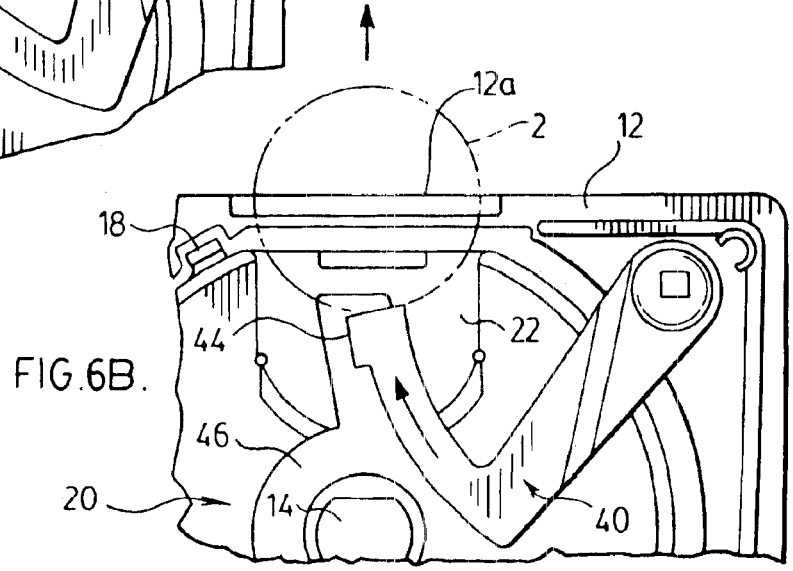
FIG. 6B is a partial rear elevation of FIG. 4 showing the coin ejection finger in an ejecting position.

In the preferred embodiment an ejector bar 40 is pivotably mounted to the cover plate 12, as shown in FIGS. 5 and 6, actuated by an ejector lever 42 exposed to the user (best seen in FIG. 1) and rotationally fixed to the ejector bar 40 through the cover plate 12. The ejector bar 40 has a tab 44 (best seen in FIG. 7A) extending into a recess 46 milled or otherwise formed in the rear face of the coin carrier 20. Manually moving the lever 42 thus pivots the ejector bar 40 between a rest position shown in FIG. 6A, out of the way of the coin recess 22, and an ejection position shown in FIG. 6B, impinging into the coin recess 22. If a user tries to insert an undersized coin or slug 2 which is too small to retrieve out of the coin slot 12a, the ejector lever 42 can be depressed to pivot the ejector bar 40 to the ejection position, moving the tab 44 through the recess 24 into the coin slot 22 and lifting the coin or slug 2 high enough to be manually removed from the coin carrier 20.

An electrical generator 50 according to the invention is illustrated in FIGS. 8 to 11. The electrical generator 50 of the invention will be described in the environment of a coin mechanism 10 for a bulk vender, however it will be appreciated that the invention can be implemented in a coin mechanism for operating any type of device or machine, and the invention is not intended to be limited to the particular coin mechanism 10 shown or the application of the preferred embodiment described herein by way of example.

The generator 50 comprises a rotor 52 comprising at least one magnetic disk 54, disposed within a stator 56 comprising coils 58. The magnetic disk 54 may be a permanent magnet, or it may be a disk containing or supporting one or more permanent magnets. The stator 56 may be composed of laminated plates, as is conventional, and preferably comprises two coils 58 connected [in series?]. Thus, as the rotor 52 rotates within the stator 56, the magnetic field generated by the magnet 54 moves past the coils 58 and generates an electric current.

The level of current depends upon the rotational speed of the rotor 52 within the stator 56. In order to render the rotational speed of the rotor 52 independent of the rate at which a user turns the handle 16, the rotor 52 is driven by a drive wheel 60. The drive wheel 60 is rotatably disposed over the shaft 14 via hub 60a, so that the drive wheel 60 can rotate independently of the handle 16, and is biased to a rest position illustrated in FIG. 8 by at least one biasing member, for example tension springs 62. In the embodiment shown two tension springs 62 are respectively anchored to diametrically opposite sides of the drive wheel 60 and cover plate 12, which biases the drive wheel 60 to the rest position with a relatively balanced force, and the periphery of the drive wheel 60 is channeled (like a pulley) to accommodate the springs 62. However, it is possible to use any number of tension springs 62 in the manner shown, or to mount the drive wheel 60 on a coiled leaf torsion spring (not shown) anchored to the hub of the drive wheel 60 and the shaft 14, or in any other suitable manner bias the drive wheel 60 to the rest position.

Figure 8:
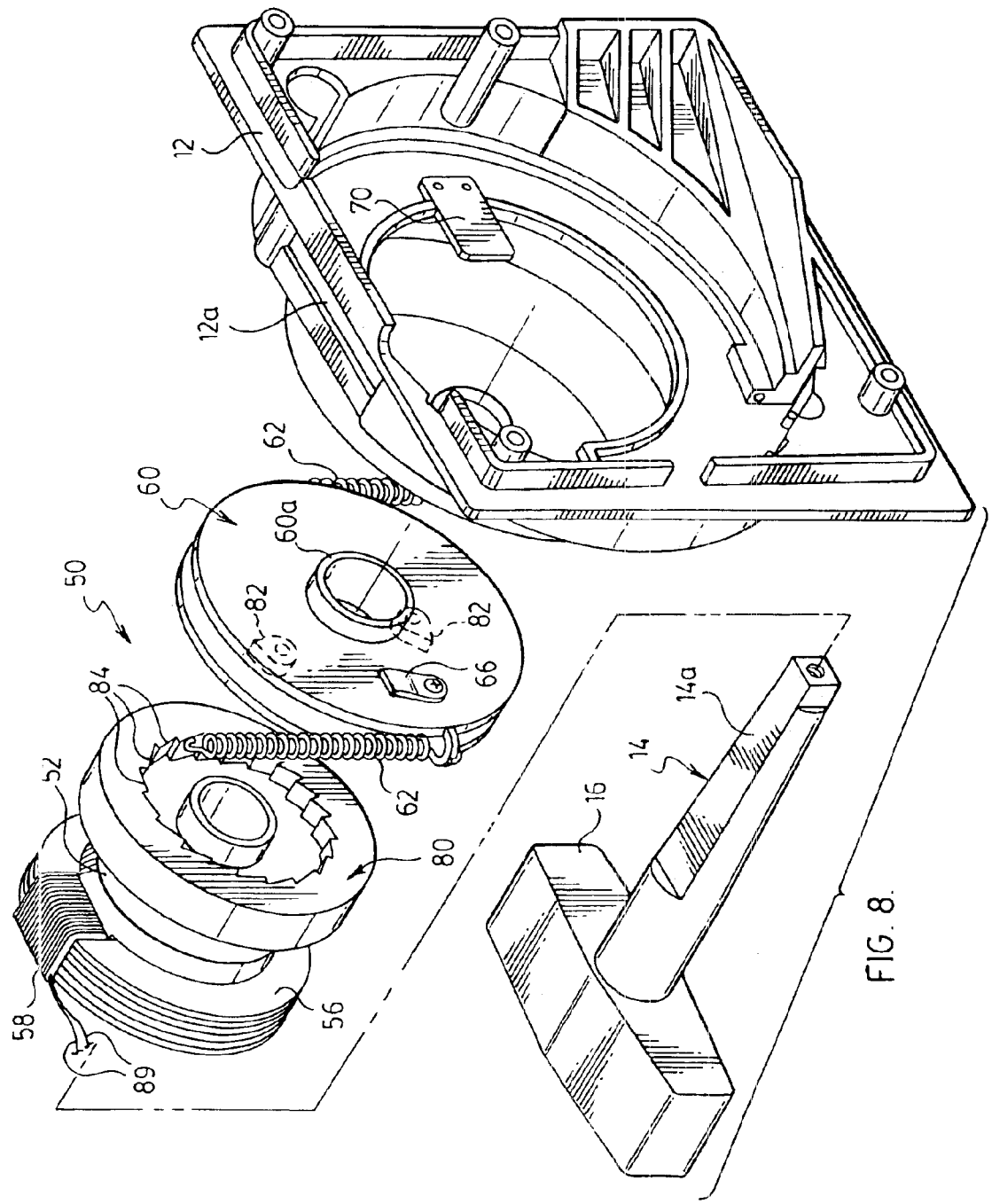
FIG. 8 is a partially exploded perspective view of the generator in the coin mechanism of FIG. 1.

The drive wheel 60 is engaged to the coin carrier 20 by a releasable latch, for example a leaf spring 66 engaged to a stop 68 on the coin carrier 20, as best seen in FIG. 8. As the handle 16 (and thus the shaft 14) is rotated by the user, the drive wheel 60 turns and the springs 62 are tensioned until the drive wheel 60 has been rotated to a release point, at which the spring 66 reaches release finger 70 affixed to the cover plate 12. When the drive wheel 60 has been rotated to the release point, the finger 20 pries the spring 66 away from the stop 68 and releases the drive wheel 60 from the coin carrier 20. The potential energy stored in the loaded springs 62 is then converted to kinetic energy as the drive wheel 60, freed from the coin carrier 20, snaps back to the rest position shown in FIG. 8. In the embodiment shown using tension springs 62, preferably the release point is no greater than halfway through the rotational cycle of the coin mechanism 10 so that the springs 62 do not overlap and interfere with one another. A longer return cycle may be achieved by using a torsion spring (not shown) mounted to the hub 60a instead of tension springs 62.

In the preferred embodiment the drive wheel 60 is selectively engaged to the rotor 52 only during the interval between the release of the drive wheel 60 and its return to the rest position. This allows the rotor 52 to spin freely, and thus continue to generate an electric current, after the drive wheel 60 has returned to the rest position. In the preferred embodiment this is accomplished using a centrifugal clutch comprising a clutch wheel 80, which is affixed to (or integral with) the rotor 52 and extends outside of the stator 56. The centrifugal clutch further comprises clutch pawls 82 which are mounted to the drive wheel 60, cooperating with clutch teeth 84 disposed about the periphery of a circular recess 80a concentric with the clutch wheel 80. The clutch teeth 84 are angled like ratchet teeth, so that the pawls 82 can engage the clutch teeth 84 only in the direction of rotation of the drive wheel 60 as it snaps back to the rest position, and the pawls 82 are pivotally mounted and balanced so that they engage the clutch teeth 84 only when the drive wheel 60 is rotating back to the rest position. The pawls 82 are advantageously formed from lightweight plastic, so the pawls 82 can pivot under a very slight force, however the components of the clutch may be formed from any suitable material or combination of materials. Also, any number of pawls 82 may be provided for the clutch, however two pawls 82 provide a balanced engagement between the pawls 82 and the clutch wheel 80.

In the operation of the generator 50 of the invention, a user inserts a coin 2 of the required denomination into the coin recess 22 through the coin slot 12a in the cover plate 12, and rotates the handle 16. The drive wheel 60 is engaged to the coin carrier 20 by releasable latch 66 engaged against the leading face of stop 68. As the drive wheel 60 turns, the springs 62 are stretched and loaded. As the latch 66 is rotated past the release finger 70, the release finger 70 (which is fixed to the cover plate 12) pries the latch 66 away from the stop 68, releasing the drive wheel 60 from the coin carrier 20. The potential energy in the springs 62 is converted to kinetic energy as the drive wheel 60 snaps back to the rest position under the force of the springs 60. The centrifugal effect of the sudden rotation of the drive wheel 60 causes the pawls 82 to pivot outwardly, engaging the clutch teeth 84 of the clutch wheel 80 and transmitting the kinetic energy of the drive wheel 60 to the clutch wheel 80, and thus to the rotor 52. The rotor 52 spins, moving the magnetic field past the coils 58 of the stator 56 and generating an electric current which is transmitted via wires 89 to the electrical system(s), examples of which are described below.

Once the drive wheel 60 reaches the rest position the pawls 82 are no longer influenced by centrifugal effect, and are easily pushed to the disengaged position by the gradual angle of the clutch teeth 84, so the clutch wheel 80 and rotor 52 continue to rotate under the momentum imparted by the drive wheel 60. Thus, it is advantageous if the rotor 52/clutch wheel 80 assembly has a relatively large mass, so that it can serve as a flywheel after the drive wheel 60 reaches the rest position and continue to generate a current. The current will reduce as the rotor 52/clutch wheel 80 assembly slows, but sufficient current can nevertheless be recovered during this free-wheeling phase of the generator cycle to charge a small battery 76 or operate a low-power device such as a silicon chip (not shown).

The electric current thus produced can be used to power an electrical or electronic device or load. For example, in a vending machine which uses a solenoid to open a gate in order to release merchandise to a user, previously such a vending machine could only be installed near a mains power supply. The electrical generator 50 of the invention supplies a sufficient momentary current to activate a solenoid and open the merchandise release gate.

In the above-described embodiment the rotor 52 rotates within the stator 56 to expose the stator coils 58 to a moving magnetic field. It will be appreciated that with suitable modifications the rotor 52 could surround the stator 56 and rotate about the stator 56 rather than within it; and that the rotor 52 could provide one or more coils 58 while the stator 56 provides a magnet, instead of the reverse as described and shown. In all of these cases the electric current is generated by the relative motion of the coils 58 through the magnetic field generated by one or more magnets, and the principles of the invention will still apply.

The electrical generator 50 of the invention also supplies a sufficient current to recharge the battery 76, which can be used as an auxiliary power supply to supply a current when the handle 16 is not being rotated, which for example can be sufficient to operate a silicon chip 118, such as a so-called "tag" for counting or tracking vending activity. The battery 76 would enable a clock in the chip 118 to maintain time between vends, or a digital counter 118 to maintain an accumulated count between vends.

Figure 12:
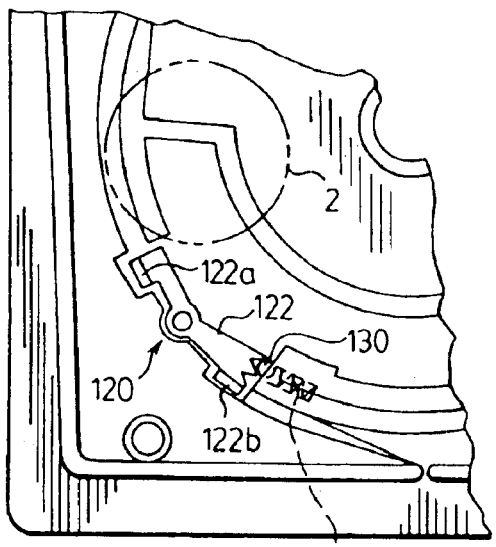
FIG. 12 is a partial rear elevation showing the counter switch.
Figure 13A:
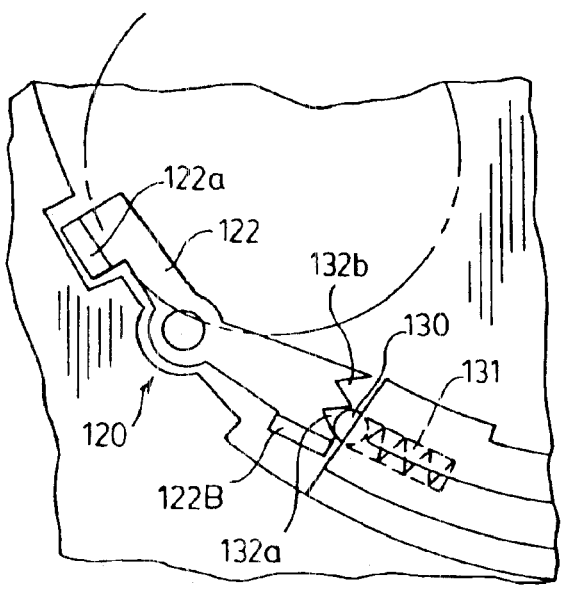
FIG. 13A is an enlarged partial rear elevation showing the counter switch being switched to the 'on' position.
Figure 13B:
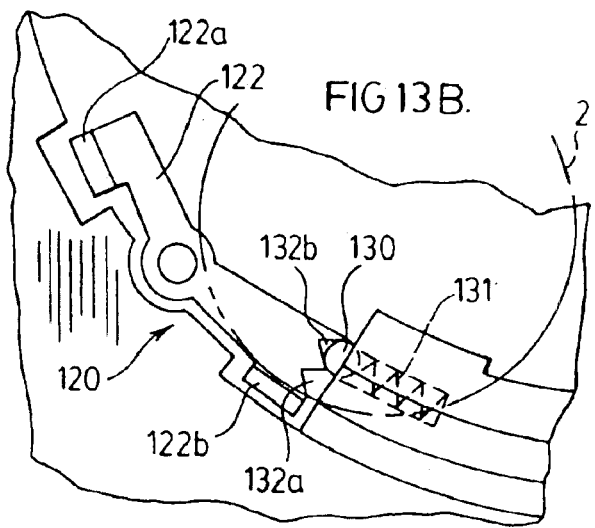
FIG. 13B is an enlarged partial rear elevation showing the counter switch being switched to the 'off' position.
Figure 14A:
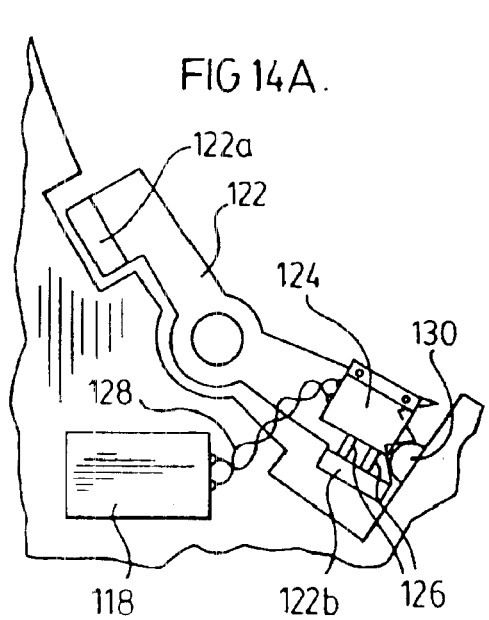
FIG. 14A is an enlarged partial rear elevation showing the counter switch closing the counter contacts in the 'on' position shown in FIG. 13A.
Figure 14B:
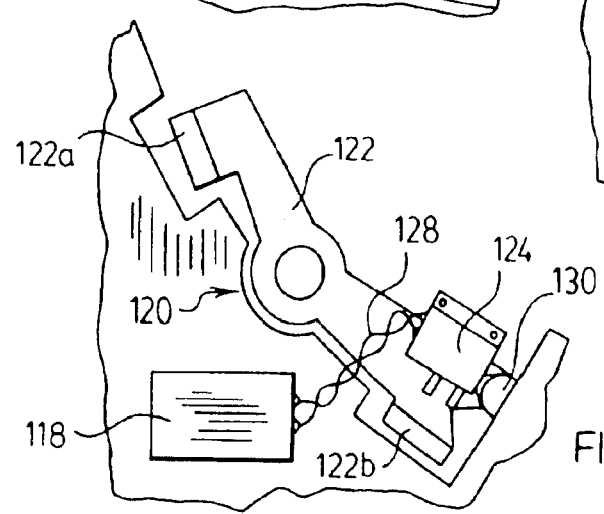
FIG. 14B is an enlarged partial rear elevation showing the counter switch disengaged from the counter contacts in the 'off' position shown in FIG. 13B.

In this embodiment, it is important to ensure that the counter or tag 118 counts only once with each vend of the vending machine, the switch that pulses the counter or tag must do so only once during each complete cycle of the coin mechanism 10, which is representative of a single vending event. This incrementally increases the vend count in the counter or tag 118 by a unit, and optionally records the date and time of the vending event. To ensure this, in one preferred embodiment shown in FIGS. 12 to 14, a switching interface 120 comprises a dog 122 having at each end an upstanding finger 122a, 122b in the path of a coin 1. The finger 122b is conductive or has a conductive coating applied to it. A contact housing 124 (shown in FIG. 14) is positioned with contacts 126 facing the finger 122b, so that as the coin 2 passes the finger 122a it pushes the finger 122b against the contacts 126 to thus close a circuit through wires 128 and generate a count pulse in the tag 110. As the coin passes the finger 122b it pushes the finger 122b away from the contacts 126. The switch dog 122 is biased to either the open ("off") or closed ("on") position, for example by a spring-loaded ball 130 which settles into either notch 132a or notch 132b under the force of compression spring 131, depending upon the position of the dog 122, but does not allow the dog 122 to freely move between the on and off positions. The dog 122 can thus contact the contacts 126 only once with each coin 2 that passes the fingers 122a and 122b, to thus ensure a single pulse is delivered to the tag or counter 118. The wiring connections for creating this circuit (not shown) will be apparent to those skilled in the art.

Alternatively, the switching interface 120 may comprise a proximity sensor actuated by a density differential, reflective surface or other proximity actuator on the coin conveyor 40; a reed switch responsive to a magnet embedded in the coin conveyor; or some other activating interface which closes a circuit to generate a pulse on the event input pin of the tag 118. In each case the interface 120 is located at a position in the rotational cycle of the coin mechanism 10 at which the coin has already been accepted, so that the tag 118 does not falsely count partial rotations through the free-turning portion of the beginning of the coin mechanism cycle as actual vends.

In the preferred embodiment one of the vender's electrical functions is the discrimination of coins or token based on electrical conductivity. This would further improve the security of the vender and its resistance to non-metallic (e.g. plastic and cardboard) slugs. As noted above an example of a device for determining whether a coin is magnetic, and releasing the coin mechanism only when the coin is magnetic, is described and illustrated in U.S. Pat. No. 5,954,181. However, the magnetic release mechanism so described only reacts to a coin that has a magnetic component. There are many coins that are metallic but do not have a magnetic component. The invention provides a reliable means available of discriminating between nonmagnetic metallic coins and plastic or cardboard slugs.

Figure 19:
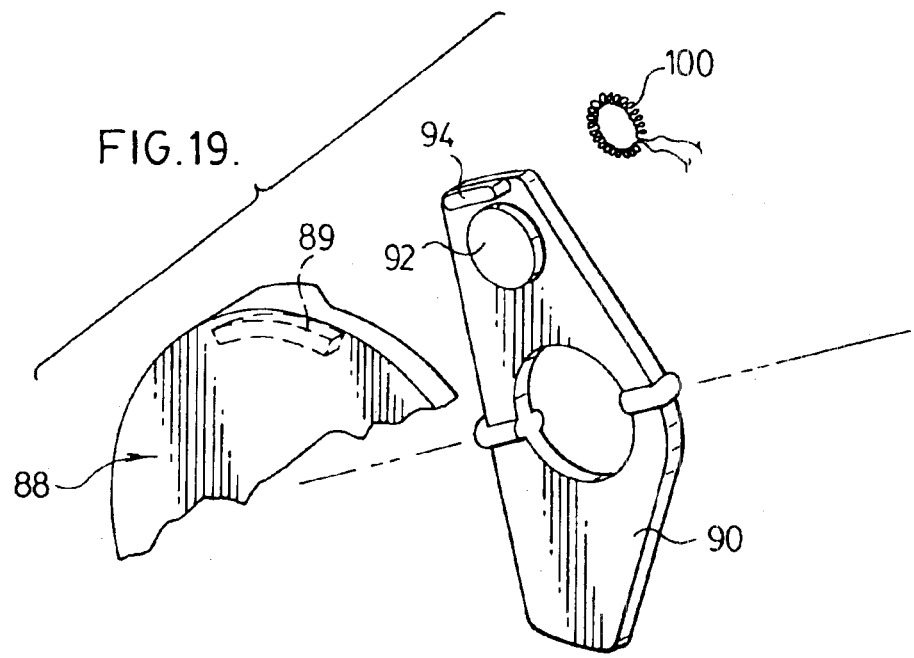
FIG. 19 is a perspective view of the magnetic release system.
Figure 20A:
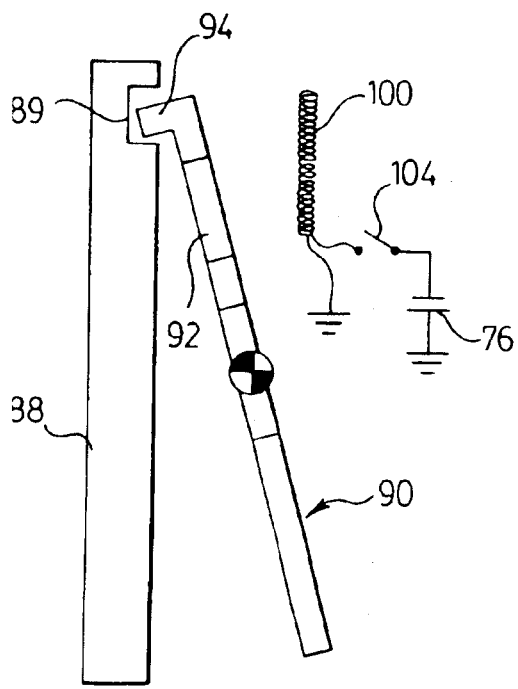
FIG. 20A is a side elevation of the magnetic locking latch engaged to the locking wheel and restraining rotation of the coin mechanism.

In the preferred embodiment the present invention includes a magnetic locking mechanism, shown in FIGS. 19 and 20, comprising a rotating member 88 which is fixed to and thus rotates with the shaft 14 (which may if desired be integral with the ratchet gear 32), and a rocker arm 90 pivotally secured to the back plate 30 so as to be able to rock between locked and unlocked positions, but not rotate with the shaft 14. The rocker arm 90 is biased to the locked position shown in FIG. 20A, with the latch 94 lodged in the recess 89 of the rotating member 88 and thus preventing the rotating member 88 from rotating. When the coin 2 deposited into the coin recess 22 is magnetic, the magnet 92 in the rocker arm 90 draws the rocker arm 90 toward the coin 2 and thus retracts the latch 94 from the slot 89 in the rotating member, allowing the rotating member to rotate. The magnetic locking mechanism thus far described is substantially as described and illustrated in U.S. Pat. No. 5,954,181 issued Sep. 21, 1999 to Schwarzli, which is incorporated herein by reference.

Figure 3:
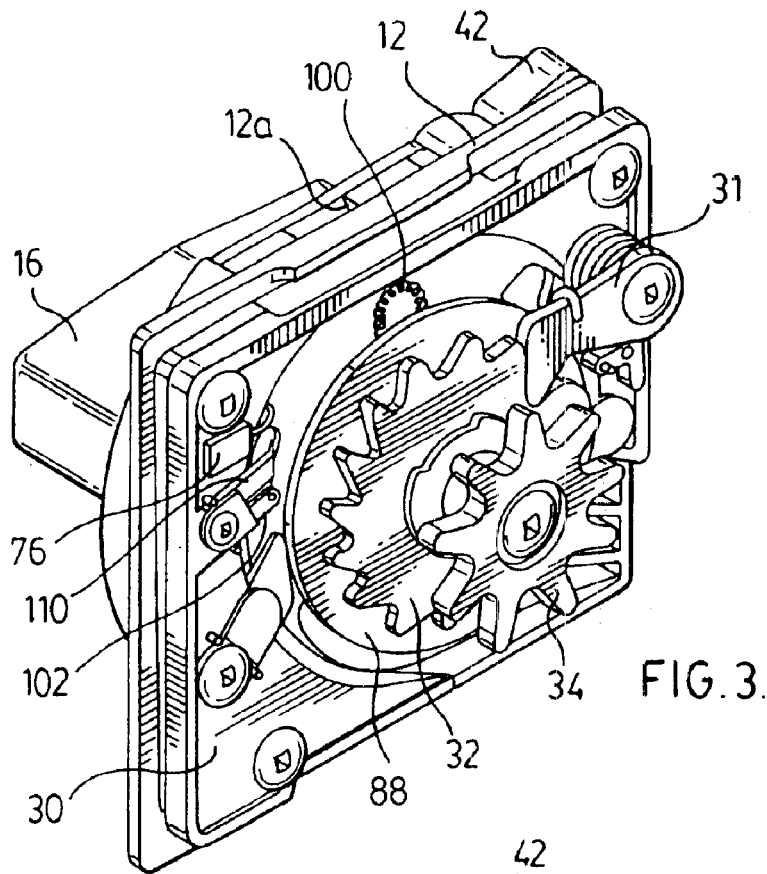
FIG. 3 is a rear perspective view of the coin mechanism of FIG. 1.
Figure 4:
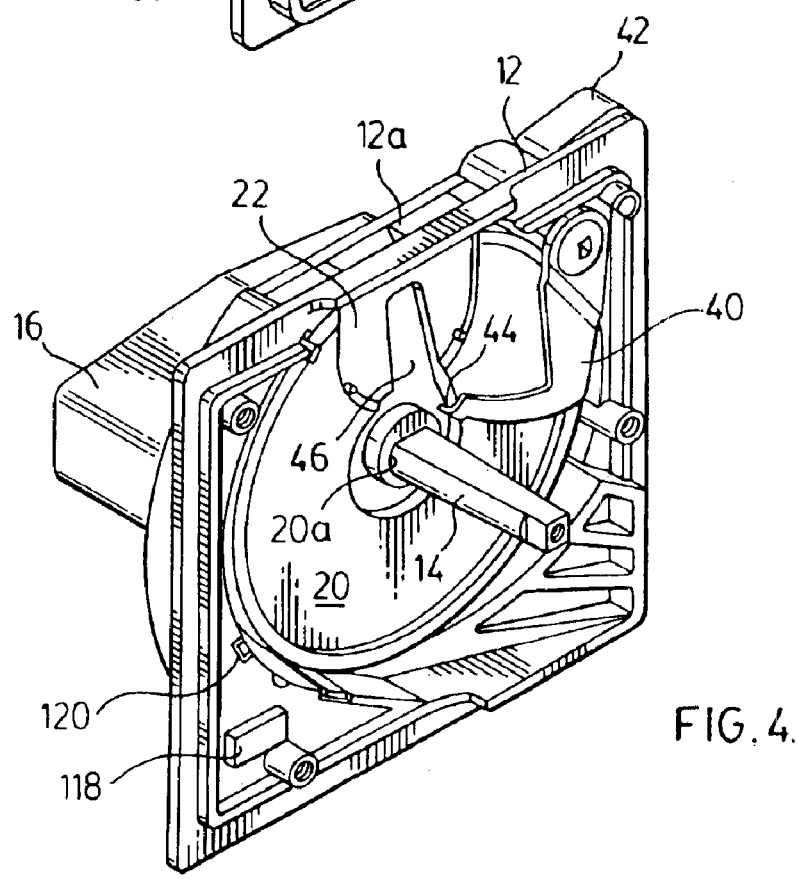
FIG. 4 is a rear perspective view of the coin mechanism of FIG. 1 with the coin carrier and internal gears removed to show a coin ejection finger.
Figure 20B:
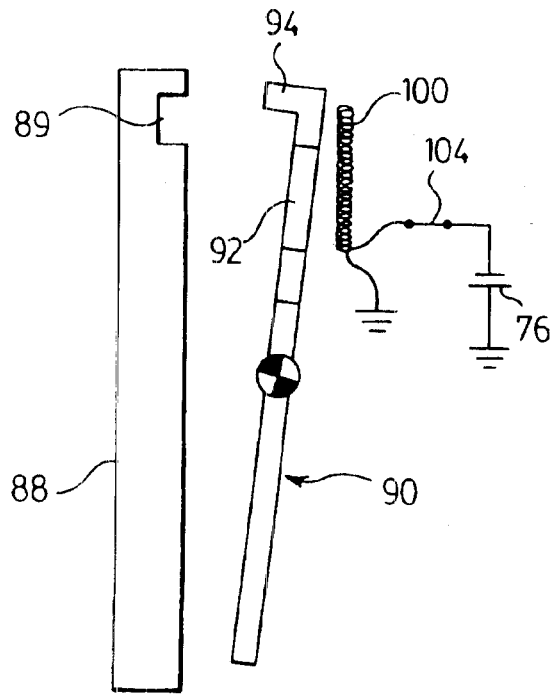
FIG. 20B is a side elevation of the magnetic locking latch disengaged from the locking wheel by the electromagnet and permitting rotation of the coin mechanism.

However, in the preferred embodiment the electrical generator 50 of the invention provides a metal detector which allows the magnetic locking system so described to unlatch the coin mechanism 10 when any conductive (i.e. metal) coin 2 is deposited into the coin recess 22, regardless whether it is magnetic, but not when a non-conductive coin is deposited. In this embodiment an electromagnet, for example a coil 100, is glued or otherwise suitably affixed to the back plate 30 near the coin recess 22, as best seen in FIGS. 3 and 7. A contact arm 102, illustrated in FIGS. 15 to 18, provides a coin contact, for example a steel ball bearing 104, disposed in the path of travel of the coin 2, and electrically isolated from the cover plate 12, for example by a neoprene bushing 106. The contact arm 102 is biased toward the coin 2. The coin carrier 20 provides a raised edge 21 (shown for example in FIG. 5) which holds the contact arm 102 away from the coin 2 until the coin recess 22 reaches the contact arm 102, at which point the arm 102 pushes the contact 104 against the coin 2. The negative terminal of the power supply (shown in FIGS. 20A and 20B as battery 76, which operates in conjunction with generator 50 as described above) is grounded to the cover plate 12, and the positive terminal is connected through the contact 104 to the electromagnet 100. If the coin 2 is conductive, when the contact 104 touches the coin 2 the circuit is closed and the electromagnet 100 is activated. The electromagnet 100 is oriented relative to the magnet 92 such that opposite poles face each other, so the magnetic attraction between the permanent magnet 92 and the activated electromagnet 100 draws the top of the rocker bar 90 away from the rotating member 88, dislodging the latch 94 from the slot 89 and allowing the handle 16 (and thus the coin carrier 20) to be rotated, as shown in FIG. 20B.

It will be appreciated that the metal detector invention could be arranged to work the opposite way, particularly for non-magnetic coins 2. The rocker arm 90 could be biased to the opposite position (top adjacent to the coin recess 22) and latched to the rotating member 88 at the bottom of the rocker arm 90, and the electromagnet 100 could be arranged with the permanent magnet 92 such that like poles face each other. In this variation, when the coin 2 is conductive the electromagnet is activated, forcing the top of the rocker arm 90 away from the coin recess 22 and unlatching the bottom of the rocker arm 90 from the rotating member 88. The effect would be the same as long as the coin 2 is not magnetic. If the coin 2 is magnetic the force of the electromagnet 100 would have to be strong enough to overcome the attraction between the magnet 92 and the coin 2, which may be impractical.

In order to avoid attempts to defeat the metal detector of the invention by using a non-metal slug of the correct size and wrapping it in a metal foil to make it seem conductive, in the preferred embodiment a scraper arm 110 is disposed in the path of travel 104a of the contact 104 across the coin 2 (shown in FIG. 15A), but upstream of the contact arm 102. The scraper arm 110, for example formed of spring steel or another suitable material, is also biased toward the coin 2 and has a sharp tip 112 which pierces any covering, such as a metal foil, and ploughs a furrow through it along the path of travel of the contact 104, as shown in FIG. 18A, so that the contact 104 touches the actual body of the coin or slug, and not a conductive coating that may have been applied to the coin or slug to "fool" the metal detector security feature.

A preferred embodiment of the invention has been described by way of non-limiting example only. Those skilled in the art will appreciate that certain modifications and adaptations may be made without departing from the scope of the invention as claimed.

I claim:

1. A generator for a coin mechanism, comprising
   a stator,
   a rotor positioned to rotate within or about the stator,
   one of the rotor and the stator comprising at least one magnetic element and the other of the rotor and the stator comprising at least one coil, and
   a drive wheel being biased to a rest position by a biasing element and rotatable to a release position, the drive wheel being selectively rotationally coupled to the rotor such that when the drive wheel is rotated to the release position and released, the drive wheel drives the rotor as the drive wheel returns to the rest position,
   whereby as the rotor rotates the generator generates an electric current.

2. The generator of claim 1 in which the drive wheel releases from the rotor as the drive wheel reaches the rest position.

3. The generator of claim 2 in which the drive wheel is rotationally coupled to the rotor by at least one pawl engaging at least one tooth.

4. The generator of claim 3 in which the pawl is biased to a position clear of the tooth and pivots to engage the tooth as the drive wheel starts to rotate to the rest position.

5. The generator of claim 1 in which the drive wheel engages the rotor at the release position.

6. The generator of claim 1 in which the wheel is biased to the rest position by at least one spring.

7. The generator of claim 1 in which the wheel is biased to the rest position by a pair of tension springs anchored to the wheel in substantially diametric relation.

8. The generator of claim 7 in which the tension springs wind into a groove formed in the periphery of the wheel.

9. The generator of claim 1 in which the generator is disposed in a coin mechanism and the wheel is rotated by a depressable member engaging a rotating portion of a coin mechanism.

10. The generator of claim 9 in which the wheel is released by a stationary projecting member which depresses the depressable member as the wheel reaches the release position, to disengage the depressable member from the rotating portion of the coin mechanism.

11. The generator of claim 1 in which the coil is on the stator.

12. The generator of claim 11 in which the stator comprises a pair of coils.

13. A coin mechanism, comprising
a rotatable handle,
a coin carrier rotatable with the handle when a particular type of coin or token is deposited into the coin carrier, coupled to a first driving member, and
a generator comprising a stator and a rotor positioned to rotate within or about the stator, one of the rotor and the stator comprising at least one magnetic element and the other of the rotor and the stator comprising at least one coil, and a drive wheel being biased to a rest position by a biasing element and rotatable to a release position by a second driving member cooperating with the first driving member, the drive wheel being selectively rotationally coupled to the rotor such that when the drive wheel is rotated to the release position and released, the drive wheel drives the rotor as the drive wheel returns to the rest position, whereby as the rotor rotates the generator generates an electric current.

14. The coin mechanism of claim 13 in which the drive wheel releases from the rotor as the drive wheel reaches the rest position.

15. The coin mechanism of claim 14 in which the drive wheel is rotationally coupled to the rotor by at least one pawl engaging at least one tooth.

16. The coin mechanism of claim 15 in which the pawl is biased to a position clear of the tooth and pivots to engage the tooth as the drive wheel starts to rotate to the rest position.

17. The coin mechanism of claim 13 in which the drive wheel engages the rotor at the release position.

18. The coin mechanism of claim 13 in which the wheel is biased to the rest position by at least one spring.

19. The coin mechanism of claim 13 in which the wheel is biased to the rest position by a pair of tension springs anchored to the wheel in substantially diametric relation.

20. The coin mechanism of claim 19 in which the tension springs wind into a groove formed in the periphery of the wheel.

21. The coin mechanism of claim 13 in which the wheel is released by a stationary projecting member which depresses the depressible member as the wheel reaches the release position, to disengage the depressible member from the rotating portion of the coin mechanism.

22. The coin mechanism of claim 13 in which the coil is on the stator.

23. The coin mechanism of claim 22 in which the stator comprises a pair of coils.

24. The coin mechanism of claim 13 in which the coin mechanism further provides
a rotating member that rotates with the coin carrier,
a rocker arm biased to a locking position latched to the rotating member to prevent rotation of the coin carrier,
one of an electromagnet or a permanent magnet on the rocker arm, the other of the electromagnet or a permanent magnet disposed adjacent to the rocker arm in a position such that when the electromagnet is activated the rocker arm can be attracted to the permanent magnet, and
a contact adjacent to the coin carrier,
whereby when a metal coin or token is deposited into the coin carrier the contact touches the coin and closes a circuit which activates the electromagnet to attract the rocker arm to the permanent magnet and draw the rocker arm away from the rotating member to release the coin carrier and allow the coin mechanism to be rotated.

25. A method of generating an electric current using a generator comprising a stator and a rotor positioned to rotate within or about the stator, one of the rotor and the stator comprising at least one magnetic element and the other of the rotor and the stator comprising at least one coil, comprising the steps of:
a. biasing a drive wheel to a rest position,
b. rotating the drive wheel to a release position,
c. before, during or after steps a. and b., coupling the drive wheel to the rotor, and
d. releasing the drive wheel,
whereby after release the drive wheel drives the rotor as the drive wheel returns to the rest position.

26. A metal detection and release system for a coin mechanism having a rotatable handle and a coin carrier rotatable with the handle when a particular type of coin or token is deposited into the coin carrier, comprising
a rotating member that rotates with the coin carrier,
a rocker arm biased to a locking position latched to the rotating member to prevent rotation of the coin carrier,
one of an electromagnet or a permanent magnet on the rocker arm, the other of the electromagnet or a permanent magnet disposed adjacent to the rocker arm in a position such that when the electromagnet is activated the rocker arm can be attracted to the permanent magnet, and
a contact adjacent to the coin carrier,
whereby when a metal coin or token is deposited into the coin carrier the contact touches the coin and closes a circuit which activates the electromagnet to attract the rocker arm to the permanent magnet and draw the rocker arm away from the rotating member to release the coin carrier and allow the coin mechanism to be rotated.

* * * * *